United States Patent [19]

Rather

[11] Patent Number: 4,884,274
[45] Date of Patent: Nov. 28, 1989

[54] DETECTION OF NON-ZERO ERRORS IN THE PREFIX AND COMPLETION FRAMES OF HIGH DENSITY MAGNETIC TAPES AND APPARATUS THEREFOR

[75] Inventor: Howard H. Rather, Boulder, Colo.

[73] Assignee: Aspen Peripherals Corp., Longmont, Colo.

[21] Appl. No.: 183,149

[22] Filed: Apr. 19, 1988

[51] Int. Cl.[4] .......................................... G06F 11/10
[52] U.S. Cl. .................................. 371/57.2; 371/40.3; 360/53
[58] Field of Search .................... 371/38, 57, 55, 39, 371/40, 47; 360/53, 48, 41

[56] References Cited

U.S. PATENT DOCUMENTS

| | | | |
|---|---|---|---|
| 4,201,976 | 5/1980 | Patel | 371/50 |
| 4,534,031 | 8/1985 | Jewer | 371/38 |
| 4,540,295 | 10/1985 | Purvis | 371/38 X |
| 4,637,023 | 1/1987 | Lounsbury | 360/53 X |

OTHER PUBLICATIONS

American National Standard Magnetic Tape and Cartridge for Information Interchange 18-Track, Parallel, 12.65 MM (½ Inch), 1491 CPMM (37 871 CPI), Group--Coded Recording-Feb. 9, 1988.

Adaptive Cross-Parity (AXP), Code for a High-Density Magnetic Tape Subsystem-IBM Journal Research Development, vol. 29, No. 6, pp. 546-562.

Primary Examiner—Jerry Smith
Assistant Examiner—Robert W. Beausoliel
Attorney, Agent, or Firm—Dorr, Carson, Sloan & Peterson

[57] ABSTRACT

A method and apparatus for correcting the presence of non-zeros in the prefix and completion frames of a high density magnetic storage tape and for issuing a pointer identifying the track and frame that the non-zero error condition arose.

4 Claims, 4 Drawing Sheets

FRAMES

| | FC1 | FC2 | FC3 | FC4 | FC5 | FC6 |
|---|---|---|---|---|---|---|
| A8 | 00 | 00 | 9c | df | ac | 53 |
| A0 | 00 | 00 | 0d | a7 | ac | 53 |
| A1 | 00 | 00 | 12 | 44 | 00 | 00 |
| A2 | 00 | 00 | 34 | 55 | 00 | 00 |
| A3 | 00 | 00 | 56 | 66 | 00 | 00 |
| A4 | 00 | 00 | 78 | 77 | 00 | 00 |
| A5 | 00 | 00 | aa | 88 | 00 | 00 |
| A6 | 00 | 00 | 55 | 99 | 00 | 00 |
| A7 | 00 | 00 | 66 | 69 | 00 | 00 |
| B7 | 00 | 00 | 77 | 00 | 00 | 00 |
| B6 | 00 | 00 | 83 | 12 | 00 | 00 |
| B5 | 00 | 00 | 99 | 34 | 00 | 00 |
| B4 | 00 | 00 | 00 | 00 | 00 | 00 |
| B3 | 00 | 00 | 11 | f1 | 00 | 00 |
| B2 | 00 | 00 | 22 | 97 | 00 | 00 |
| B1 | 00 | 00 | 33 | f8 | 00 | 00 |
| B0 | 00 | 00 | 15 | 0d | 97 | f7 |
| B8 | 00 | 00 | 73 | b5 | 97 | f7 |
| | FC6 | FC5 | FC4 | FC3 | FC2 | FC1 |

TRACKS

SET A { A8–A7 }
SET B { B7–B8 }

*Fig. 1*

DETECTION OF NON-ZERO ERRORS IN THE PREFIX AND COMPLETION FRAMES OF HIGH DENSITY MAGNETIC TAPES AND APPARATUS THEREFOR

BACKGROUND OF THE INVENTION

1. Field of the Invention—The present invention relates to enhanced error correction capabilities by testing for all zeros in the prefix and completion frames of high density magnetic tapes and, in particular, the present invention relates to an enhanced correction capability for testing prefix and completion frames for all zeros in IBM 3480 high density magnetic tape before entering the adaptive cross-parity (AXP) correction process.

2. Discussion of Prior Art—The IBM 3480 magnetic tape sub-system is a high-density eighteen-track, parallel, magnetic tape storage sub-system. The IBM 3480 magnetic tape forms the basis of the "Proposed American National Standard Magnetic Tape and Cartridge for Information Exchange Eighteen-Track Parallel, 12.65 MM (½ inch), 1491 CPMM (37 871 CPI) Group-Recording as prepared by Technical Committee X3B5 and as set forth in X3B5/88-044, Feb. 9, 1988 published by the American National Standard Institute.

The IBM 3480 high density tape incorporates an error correction system utilizing adaptive cross-parity (AXP) code. This is discussed in Patel, "Adaptive Cross-Parity AXP Code for a High Density Magnetic Tape Sub-System", IBM Journal Research and Development, Vol. 29, No. 6, Nov. 1985, Pgs. 546-562 and in U.S. Pat. No. 4,201,976.

In the proposed ANS Standard and as shown in FIG. 1, the prefix frames are all zeros and the completion frames in tracks B1 through B7 and A1 through A7 are all zeros. In FIG. 1, there are two sets of tracks: set A and set B. Set A has nine tracks, A0 through A8, and set B has nine tracks, B0 through B8. In the example shown in FIG. 1, there are six frames shown. When the tape moves in the forward direction, as shown by arrow 10, the frames are read in the order of FC1 through FC6. When the tape is read in the reverse direction as shown by arrow 20, the frames are renumbered and are also read in the order of FC1 through FC6. When the tape is read in the forward direction 10, frames FC1 and FC2 are the prefix frames. When the tape is read in the reverse direction 20, frames FC1 and FC2 are the completion frames. The prefix frames are all zeros and the completion frames in tracks B1 through B7 and A1 through A7 are all zeros unless an error occurs. Frames FC3 and FC4 comprise the channel supplied or customer data which varies in length and content. Tracks A8 and B8 are the VRC tracks which provide the vertical redundancy check. Tracks A0 and B0 are the DRC tracks which provide the diagonal redundancy check. The use of the VRC and DRC tracks are fully discussed in the Patel paper.

SUMMARY OF THE INVENTION

The present invention provides an apparatus for detecting the presence of non-zero errors in a track in the prefix, when reading forward, and completion, when reading backward, frames; for providing a pointer to the track for use by conventional error correction processor; and for setting all byte fields in the prefix and completion frames to zero.

The method of the present invention determines the presence of non-zero errors in frames one and two of the prefix (when reading forward) and completion (when reading backward) frames, stores the identity of the track containing the non-zero error, and sets all byte fields in the prefix and completion frames to zero so that any non-zero errors contained therein are corrected.

DESCRIPTION OF THE DRAWING

FIG. 1 Is an illustration of the prior art tape format for the IBM 3480 high density tape system.

DESCRIPTION OF THE PREFERRED EMBODIMENT

Figure 2:
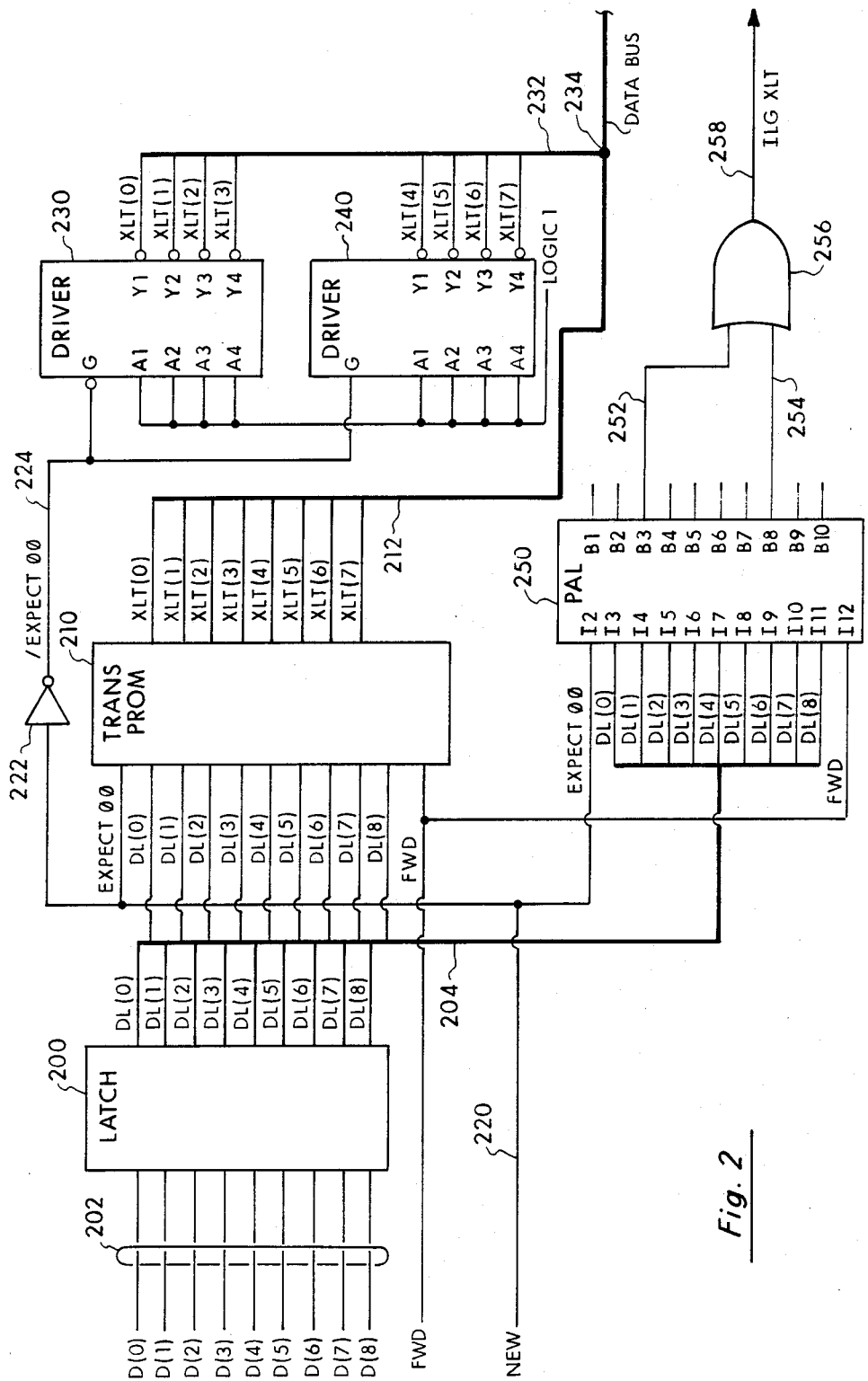
FIG. 2 is the schematic for detecting the presence of non-zero errors in the prefix (when reading forward) and completion (when reading backward) frames of IBM 3480 high density magnetic tape, FIG. 3 sets forth the schematic for generating a pointer signal for non-zero errors in set A tracks and set B tracks.

In FIG. 2 is the schematic of the present invention for sensing the presence of non-zeros in the prefix (when reading forward) and completion (when reading backward) frames of IBM 3480 high density magnetic tapes. Whether the tape is read in the forward 10 or reverse 20 directions, the nine bit data being read from the tape is delivered into latch 200 over lines 202. The nine bits are all from one track. For example the "56" byte at coordinate A3-FC3 of FIG. 1 is the eight bit translation of the nine bit value appearing at the latch.

The nine bit data is then delivered from the latch 200 over bus 204 into a translation PROM 210. The translation PROM is of standard type such as that manufactured by Advanced Micro Devices (AMD), 901 Thompson Place, Sunnyvale, California 94088 as Part No. 27S291. The translation PROM translates the nine bit state (D(0) through D(8)) to the eight bit state of the computer (XLT(0) through XLT(7)). This translation process is fully set forth and discussed in the proposed ANSI proposed standard set forth above. The output of the translation PROM is delivered over bus 212 into the system. The latch 200 and the translation PROM 210 operate in a conventional fashion to translate from the nine bit state on tape to the eight bit state of the computer.

Under the teachings of the present invention, the translation PROM 210 is automatically disabled during frames 1 and 2 (FC1 and FC2) which force the data bus 212 to be in the zero state. Hence, when the signal EXPECT00 appearing on line 220 is high, the translation PROM 210 is disabled and forces the XLT output on bus 212 to be high impedance.

As shown in FIG. 2, the EXPECT00 signal is delivered through an inverter 222 and the inverse of EXPECT00 is delivered over line 224 to the output enable of driver 230 and to the output enable of driver 240. Drivers 230 and 240 are conventionally available as Model 74LS240 from Texas Instruments. The presence of the inverse EXPECT00 signal on line 224 causes the output of the drivers on lines 232 to be zero. The outputs on lines 232 also correspond to XLT(0) through XLT(7). The signals on line 232 are wire-ORed together at point 234 to provide the XLT signals into the system.

Hence, whether or not the prefix and completion frames are zero is immaterial as the above described circuitry always forces the prefix and completion frames to be zero. It is important to keep in mind that two readings of the tape are required under the proposed ANSI standard, one in the forward direction 10 and one in the reverse direction 20. Hence, the above circuitry of the present invention forces frames FC1 and FC2 in the forward direction 10 to be zero and forces frames FC1 and FC2 in the reverse direction 20 to be zero when they are read.

It is to be expressly understood that other circuit arrangements could be implemented to perform the aforesaid teachings of the present invention i.e., to logically provide all zeros in the prefix and completion frames.

In addition, the EXPECT00 signal on line 220 is delivered into a PAL (programmable array logic) circuit 250. This circuit is conventionally available from AMD as Model No. AmPAL 22V10. This circuit 250 serves to detect the presence of a non-zero error in the FC1 and FC2 tracks nd to generate a pointer to identify the track with the non-zero error contained within it. The output of the PAL is delivered over lines 252 and 254 into a OR-gate 256 which generates an illegal signal ILG XLT which essentially means that an illegal nine bit pattern on a track has been detected. The PAL 250 operates on the nine bit tape field DL(0) through DL(8).

Figure 4:
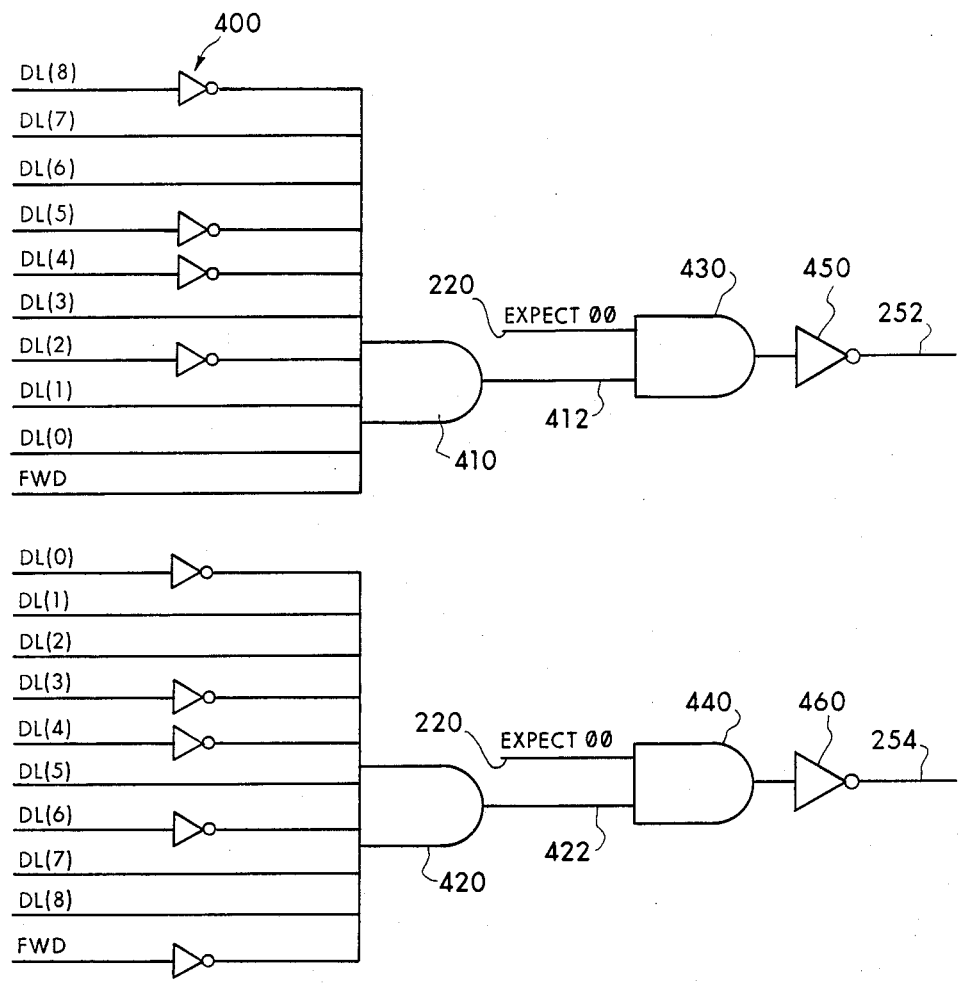
FIG. 4 illustrates the logical programming required for the programmable array logic 250 of FIG. 2.

In FIG. 4, the logical approach for the programming of PAL 250 is set forth. The nine bit data inputs DL are selectively inverted 400 as shown and then fed into two AND-gates 410 and 420. AND-gate 410 generates a "detect all zeros" signal on lead 412 in the forward reading and AND-gate 420 generates a "detect all zeros" signal on lead 422 in the backward reading. AND-gates 430 and 440 are then enabled by EXPECT 00 to gate the signals out through inverters 450 and 460 to lines 252 and 254. It is to be expressly understood that the PAL 250 could be conventionally programmed based upon the logic of FIG. 4.

The signal on line ILG XLT 258 represents the detection of a non-zero error at a particular track in frames FC1 and FC2 either in the prefix or in the completion frames. The signal can now be utilized by a conventional error correction processor and may be indicative of error in subsequent bytes in that identified track.

Figure 3:
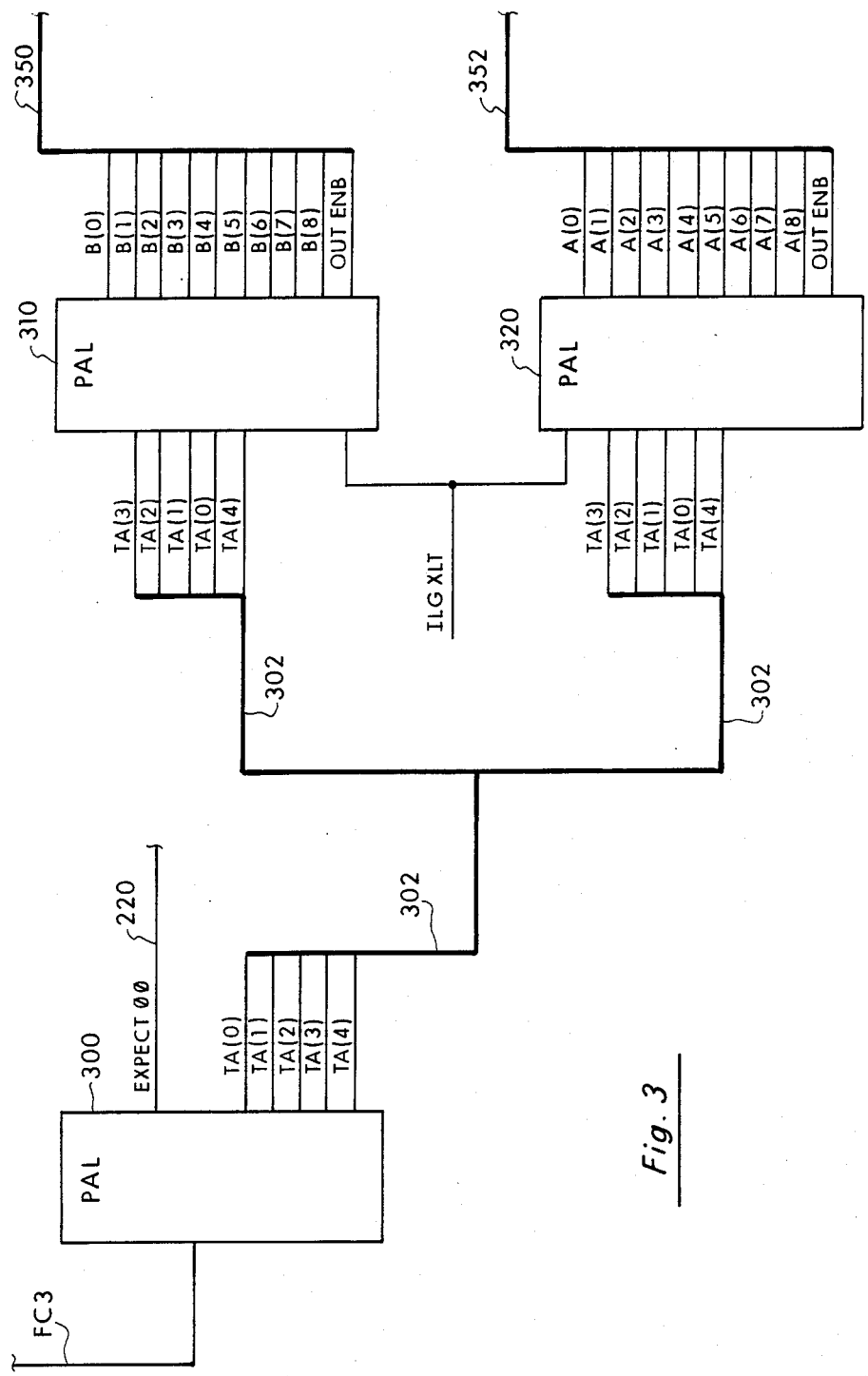

The generation of the EXPECT00 signal is shown in FIG. 3 and is generated by PAL 300. PAL 300 is commercially available as Model No. AmPAL 22V10 from AMD. The EXPECT00 signal is generated on lead 220. The generation of the EXPECT00 signal is based upon the following equations which are used to program PAL 300:

$$\text{EXPECT00} = /FC3 * /TA3 * TA0 +$$
$$/FC3 * /TA3 * TA1 +$$
$$/FC3 * /TA3 * TA2$$

In the above, the designation "/" means "not", the designation "+" means "or" and the designation "*" means "and." EXPECT00 becomes active only for frames FC1 and FC2 and then from FC3 to all subsequent frames, EXPECT00 is inactive. Furthermore, the present invention ignores the VRC and DRC tracks. Hence, only tracks A1 through A7 (i.e., Set A) and B7 through B1 (i.e., Set B) are utilized as shown in FIG. 1. In the above formulas, EXPECT00 is active only when FC3 is inactive (i.e., /FC3) which indicates processing of the first two frames FC1 and FC2. FC3 is conventionally generated within the system and is delivered to PAL 300 as an input. The TA outputs are the track addresses.

Internal to the PAL 300 is a counter which counts as follows:

Set A Tracks:
IBM naming: A8 A0 A1 A2 A3 A4 A5 A6 A7
count seq: 08 00 01 02 03 04 05 06 07
Set B Tracks:
IBM naming: B7 B6 B5 B4 B3 B2 B1 B0 B8
count seq: 17 16 15 14 13 12 11 10 18

With reference back to FIG. 1, the reading of the tape occurs in the following fashion. Frame 1 is read in the direction of tracks A1 through B1 then frame 2 is read in the direction of tracks A1 through B1. The track address TA(0) through TA(4) (i.e., the count) is outputted on bus 302. The count sequence is in Hex and is best explained by an example:

$$\text{HEX count } 08 = 01000 = TA(4), TA(3), TA(2), TA(1), TA(0)$$

In summary, the circuit of FIG. 3 is only for frames FC1 and FC2. In addition, the track address TA is generated which corresponds to the tracks of set A and set B of FIG. 1 as discussed.

The track address on lines 302 is also delivered to two PALS 310 and 320. These PALS are conventionally available from AMD as Model AmPAL 22V10. PAL 310 converts the track addresses for the set B tracks of FIG. 1 and PAL 320 converts the track addresses on 302 to the set A tracks of FIG. 1. The conversion is set forth in the above table.

Hence, with the generation of the ILG XLT (illegal track) signal from PAL 250 of FIG. 2, a pointer is stored in PALS 310 and 320 indicating which track in which set has a non-zero error. The frame position is generated elsewhere in the system so that the identities of the frame count and the non-zero track are fully known. PALS 310 and 320 are designed to be temporary storage locations of this information until the end of the frame. At the end of each frame, this information is transferred via 350 and 352 to the error control part of the system.

While preferred embodiments of the present invention have been shown, it is to be expressly understood that modifications and changes may be made thereto and that the present invention is set forth in the following claims.

I claim:

1. An apparatus for correcting the presence of non-zero errors in high density magnetic storage tape, said high density magnetic storage tape having prefix and completion frames, each of said prefix and completion frames having a plurality of tracks wherein each said track has byte fields set to all zeroes, each said track and each said byte field having an identity and whereas said prefix frames are frame counts one and two when said tape is read in the forward direction and wherein said completion frames are frame counts one and two when said tape is read in the reverse direction, said apparatus comprising:

means receptive of each of said byte fields for each of said plurality of tracks in said frame counts one and two of said prefix and completion frames for determining whether each said byte field contains a non-zero error, means connected to said determining means for storing the identity of the track containing said non-zero byte field and the identity of the frame, and means receptive of each of said byte fields for each of said plurality of tracks in said frame counts one or two of said prefix and completion frames for setting all said byte fields to zero so that any non-zero errors contained therein are corrected.

2. An apparatus for detecting the presence of non-zero errors in high density magnetic storage tape, said high density magnetic storage tape having prefix and completion frames, each of said prefix and completion frames having a plurality of tracks wherein each said track has byte fields set to all zeroes, each said track and each said byte field having an identity and whereas said prefix frames are frame counts one and two when said tape is rear in the forward direction and wherein said completion frames are frame counts one and two when said tape is read in the reverse direction, said apparatus comprising:

means receptive of each of said byte fields for each of said plurality of tracks in said frame counts one and two of said prefix and completion frames for determining whether each said byte field contains a non-zero error, and means connected to said determining means for storing the identity of the track containing said non-zero byte field and the identity of the frame.

3. An apparatus for correcting the presence of non-zero errors in high density magnetic storage tape, said high density magnetic storage tape having prefix and completion frames, each of said prefix and completion frames having a plurality of tracks wherein each said track has byte fields set to all zeroes, each said track and each said byte field having an identity and whereas said prefix frames are frame counts one and two when said tape is read in the forward direction and wherein said completion frames are frame counts one and two when said tape is read in the reverse direction, said apparatus comprising:

means receptive of each of said byte fields for each of said plurality of tracks in said frame counts one or two of said prefix and completion frames for setting all said byte fields to zero so that any non-zero errors contained therein are corrected.

4. A method for correcting the presence of non-zero errors in high density magnetic storage tape, said high density magnetic storage tape having prefix and completion frames, each of said prefix and completion frames having a plurality of tracks wherein each said track has byte fields set to all zeroes, each said track and each said byte field having an identity and whereas said prefix frames are frame counts one and two when said tape is read in the forward direction and wherein said completion frames are frame counts one and two when said tape is read in the reverse direction, said method comprising the steps of:

determining whether each of said byte fields for each of said plurality of tracks in said frame counts one and two of said prefix and completion frames contains a non-zero error, storing the identity of the track containing said non-zero byte field and the identity of the frame in response to said determination, and setting all said byte fields into zero sa that any non-zero errors contained therein are corrected, each of said byte fields for each of said plurality of tracks in said frame counts one or two of said prefix and completion frames.

* * * * *